Dec. 19, 1961  A. H. WUNSCH  3,013,649
WAGON UNLOADER
Filed Feb. 20, 1959  3 Sheets-Sheet 1
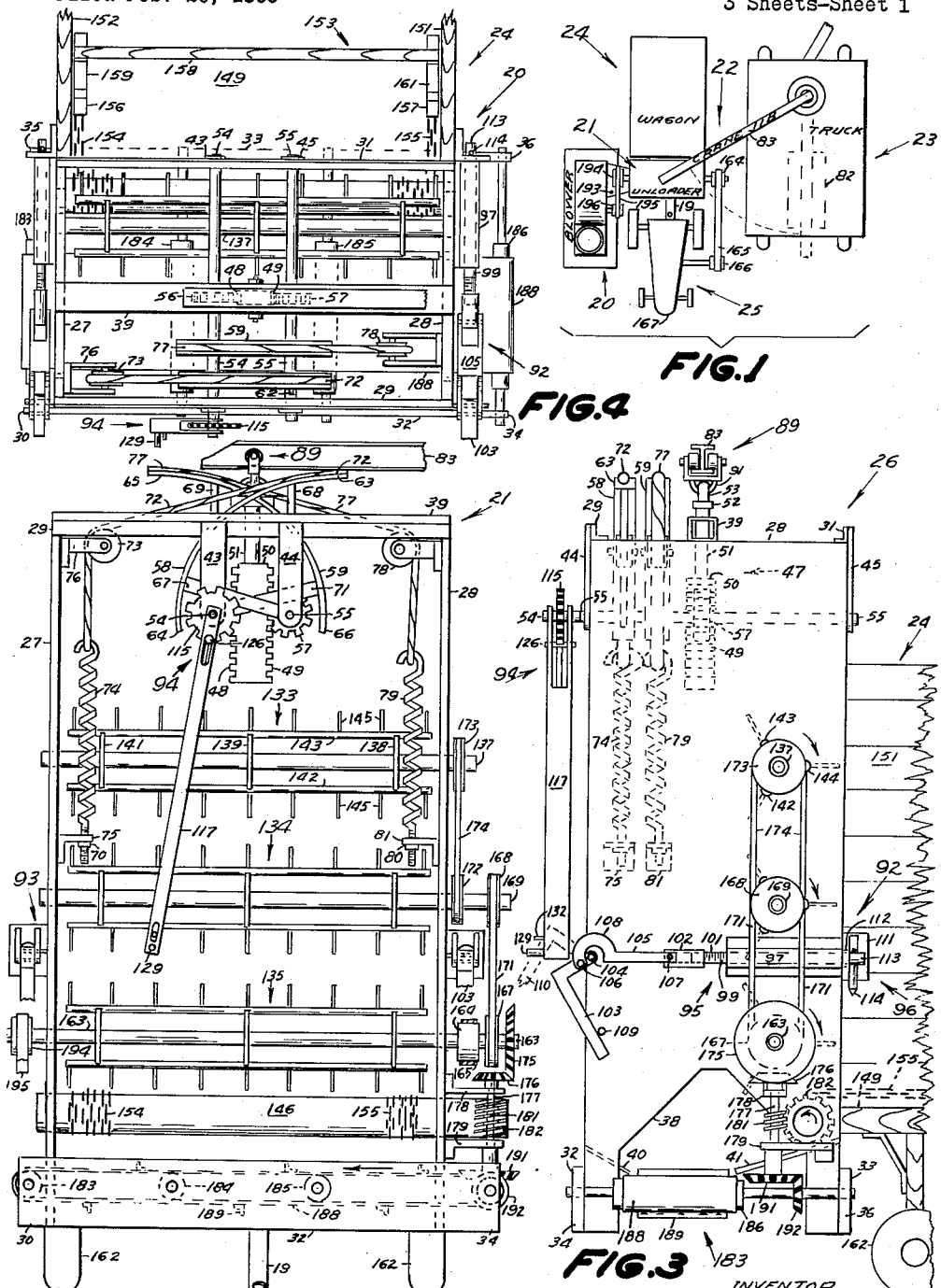
INVENTOR
ADOLPH H. WUNSCH
BY
ATTORNEY

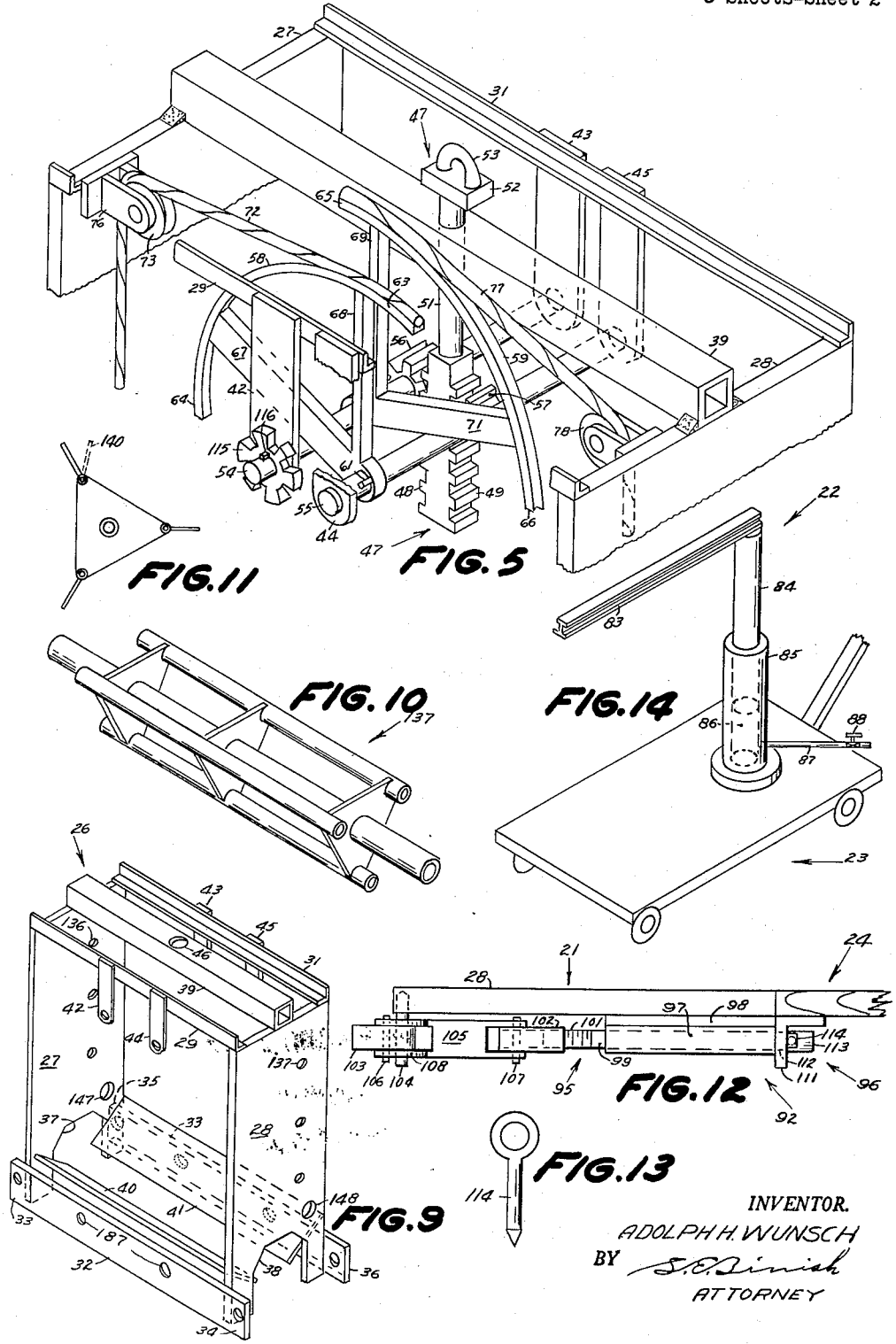

Dec. 19, 1961 A. H. WUNSCH 3,013,649
WAGON UNLOADER
Filed Feb. 20, 1959 3 Sheets-Sheet 3
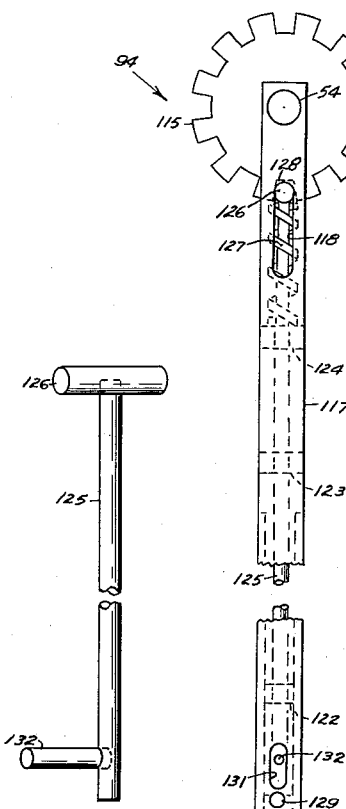
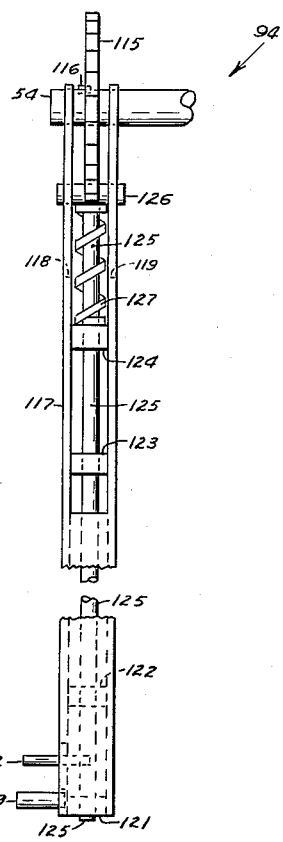
FIG.8  FIG.6  FIG.7
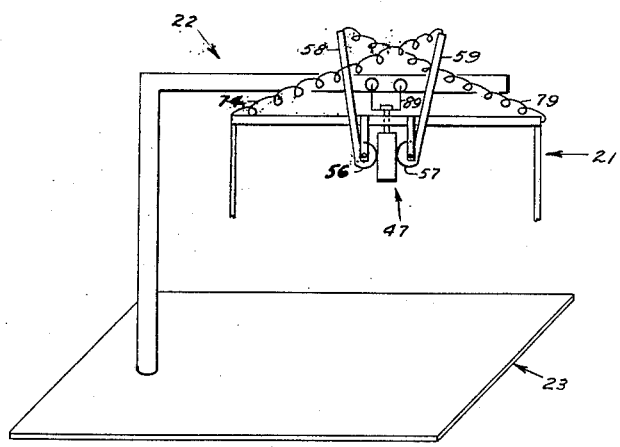
FIG.15
INVENTOR.
ADOLPH H. WUNSCH
BY
ATTORNEY

# United States Patent Office 3,013,649
Patented Dec. 19, 1961

3,013,649
WAGON UNLOADER
Adolph H. Wunsch, Rockland, Wis.
(Rte. 2, Reedsville, Wis.)
Filed Feb. 20, 1959, Ser. No. 794,575
4 Claims. (Cl. 198—126)

This invention relates generally to a warm unloader, and more particularly to an unloader pending from a swingable jib or boom, for unloading chopped hay or the like from a field chopper wagon.

The purpose of this invention is to provide a chopper wagon unloader that is easily managed and readily movable and aligned for relative positioning and fixation to a chopper wagon.

An object of this invention is the provision of a chopper wagon unloader that is pendulously supported.

Another object is to provide a chopper wagon unloader that is pendently supported on a swingable arm or jib.

Still another object of this invention is the provision of a chopper wagon unloader that is pendently mounted on a jib and movable therealong.

Yet another object is to provide a chopper wagon unloader that is pendently mounted on the jib of a crane, said jib being movable vertically.

A further object of this invention is the provision of a chopper wagon unloader that is pendently supported and spring balanced.

Still a further object is to provide a chopper wagon unloader that is pendently supported, and vertically movable relative to its supporting means.

Yet a further object of this invention is to provide a chopper wagon unloader that is easily positioned by one man.

Another object of this is to provide a chopper wagon unloader having compensation means for compensating for the effects of changes in position of some of its operative parts.

Still another object is to provide an unloader that is releasably engageable with a chopper wagon.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a schematic layout of the unloader invention and associated apparatus;

FIG. 2 is a front elevation view of the unloader invention;

FIG. 3 is a side elevation view of the unloader invention shown in FIG. 2;

FIG. 4 is a plan or top view of the unloader invention shown in FIG. 2, in which the drive gear means is omitted;

FIG. 5 is an enlarged fragmental isometric view of the top portion of the unloader invention, showing the compensation cam means;

FIG. 6 is an enlarged front elevation view of the ratchet adjusting means by which vertical movement of the unloader, relative to its associated chopper wagon, is achieved;

FIG. 7 is a side elevation view of FIG. 6;

FIG. 8 is an enlarged isometric view of the control rod and pawl means embodied in the ratchet adjusting means of FIG. 6;

FIG. 9 is an isometric view of the open box frame comprising the support means for the elements of the invention;

FIG. 10 is an isometric view of the rotary rake frame means, from which the tines have been omitted;

FIG. 11 is an end elevation view of the rotary rake means shown in FIG. 10, showing the tines included thereon;

FIG. 12 is an enlarged plan view of a lock means embodied in the unloader invention, showing means for releasably engaging the unloader invention to a chopper wagon;

FIG. 13 is an elevation view of a removable securing pin forming a part of the lock means shown in FIG. 12;

FIG. 14 is an isometric view of a jib crane mounted on a vehicle for transporting and otherwise handling the unloader invention; and FIG. 15 is a simplified schematic diagram of the unloader apparatus illustrating its general suspension features, but not showing the cam compensation means.

Referring now to the drawings, wherein like reference characters designate like or corresponding parts throughout the several views, there is shown in FIG. 1 a general layout of the unloader invention and its associated apparatus as related in operation and use. The unloader invention generally indicated at 21 is pending from a jib crane generally indicated a 22. Said jib crane is mounted on a vehicle generally indicated at 23. The unloader is operatively positioned adjacent a field chopper wagon generally indicated at 24. A tractor, generally indicated at 25, for providing driving power, is belt connected to said unloader. Said tractor is connected to said vehicle through means of pole means 19. A blower, generally indicated at 20, receives chopped hay or the like from said unloader and pneumatically conveys it where desired. Said blower is indirectly driven by said power tractor through means of said unloader's driven means, or by independent drive means if desired.

The unloader 21 includes an open box-like frame or support, generally indicated at 26, see particularly FIG. 9 and more generally FIGS. 2, 3 and 4, for supporting the operating elements of the unloader, and comprises vertically disposed and spaced side wall members 27 and 28 having angle iron top cross members 29 and 31 and lower cross bar members 32 and 33 rigidly secured to said side walls as by welding. Said lower bar members have end portions 30 and 34, and 35 and 36, respectively, extending beyond the side walls to provide conveyor journal accomodations as hereinafter described.

The lower ends of the side walls have portions removed therefrom as at 37 and 38, respectively, to provide for the disposition therethrough of a conveyor means as hereinafter described.

Across the top of said frame or support is rigidly fixed a lift beam 39.

Oppositely disposed and inclined apron plates 40 and 41 are secured across said side wall members for purposes hereinafter to be described.

Pending from the angle iron top cross members 29 and 31 are paired and oppositely disposed bearing brackets 42 and 43, and 44 and 45, respectively, for purposes hereinafter described.

Thus far is described substantially all of the box-like frame or supporting means. The hanger or suspender means for pendently supporting said frame follows.

Lift beam 39 is centrally apertured at 46 to slidably receive therein a carrier rack generally indicated at 47, having a lower end portion provided with oppositely disposed rack teeth 48 and 49, a shoulder 50, a reduced redular middle portion 51, and a top block portion 52 having an eye 53 mounted rigidly thereon.

Shafts 54 and 55, journalled in pendent bearing brackets 42 and 43, and 44 and 45, respectively, have formed or mounted rotatively-rigid thereon pinions 56 and 57 enmeshed with rack teeth 48 and 49, respectively. Said pinions are operatively movable relative to and along said rack teeth, respectively, for purposes hereinafter explained.

A pair of compensation cams 58 and 59 are likewise mounted rotatively-rigid on said shafts 54 and 55 by keys such as indicated at 61. The points on said cam 58, from the leading end 63 to the trailing end 64, are progressively nearer to the pivotal axis of said cam 58; and likewise, the points on cam 59, from the leading end 65 to the trailing end 66, are progressively nearer to the pivotal axis of said cam 59.

Said cams are provided with spokes 67 and 68, and 69 and 71, respectively. The counterclockwise rotation of cam 58 is limited by the abutment of spoke 67 against shaft 54; and the clockwise rotation of cam 59 is limited by the abutment of spoke 71 against shaft 55.

The purpose of the stop abutments is explained in detail hereinafter.

The purpose of the compensation cams 58 and 59 is explained in detail hereinafter.

A steel cable 72 or the like is secured to the leading end 63 of cam 58 as by welding or other means. The remaining portion of said cable 72 is trained over a rotatably mounted trunnioned sheave 73, operatively aligned with said cam 58, and secured to one end of an aligned tension spring 74, the other end of said tension spring being adjustably anchored to a bracket 75, mounted on the inner face of side wall 27 of unloader 21, by means of threaded nut means 70.

Trunnioned sheave 73 is journalled in a suitable bracket 76 also mounted on the inner face of side wall 27.

A corresponding steel cable 77 or the like is secured to the leading end 65 of cam 59 as by welding or other means. The remaining portion of said cable 77 is trained over a rotatably mounted trunnioned sheave 78, operatively aligned with said cam 59, and secured to one end of an aligned tension spring 79, the other end of said tension spring being adjustably anchored to a bracket 81, mounted on the inner face of side wall 28 of unloader 21, through means of threaded nut means 80.

The springs are initially tensioned to counteract a predetermined portion of weight of the unloader. Such initial tensioning draws the cam spokes 67 and 71 against the respective shafts 54 and 55 with a threshold force thereagainst, and thereby in effect locks or holds said initial tension in the system.

Although the internal mechanism of the unloader has not yet been described, it is thought advisable at this point, while fresh in mind, to describe the operation and function of so much of the unloader as has been described, that is the supporting frame and the counterbalancing lift means. This same procedure will be followed hereafter as other sub-assemblies are described. The term unloader will be applied not only to the complete unloader apparatus, but also to the unloader in its various stages of development, commencing with the box-like frame 26.

Assume that the unloader is at rest on a support or platform. When an upward lift force is applied to the ring or eye 53, the initial tension or threshold force must first be overcome. Thereafter, as a continually increasing lift force is applied, the carrier rack means 47 moves upwardly relative to the unloader. As the carrier rack means moves upwardly it moves upwardly relative to the pinions, and the enmeshed pinions 56 and 57, and their rotatively-rigid associated shafts 54 and 55 are rotated counterclockwise and clockwise, respectively, in their journals. Cams 59 and 58, being mounted rotatively-rigid on said shafts 54 and 55, are likewise rotated counterclockwise and clockwise, respectively. As a result of such movement, cables 77 and 72, connected to anchored springs 79 and 74, follow the movement of their associated cams 59 and 58, and stretch said springs, tensionally, until forces developed in the springs counterbalance the weight of the unloader, at which time relative movement between the rack means and the pinions, ceases. Thereafter, continued upward movement of the lift force lifts the unloader means bodily upwardly, correspondingly, to a pendent or suspended status.

The springs are preferably initially tensioned and of such strength that the load of the unloader will be counterbalanced and lifted when the pinions are related to the rack teeth substantially at the middle of the rack teeth section, in other words, when the pinions are disposed substantially at the center of the operative range of the rack teeth, and likewise, when the associated cables are tangent to the cams at or near the center of the operative range of the cams.

When the unloader is to be let down onto a platform or support, the suspended unloader is bodily moved downwardly to the platform until its bottom contacts the platform. Thereafter continued downward movement of the lift force results in a gradual decrease in the measure of said force until the spokes of the sectors abut and otherwise threshold against the respective shafts 54 and 55. When the lift force first commenced its downward movement, carrier rack 47 moves downwardly relative to the stationary unloader, the coacting pinions 56 and 57, their associated shafts 54 and 55, and the associated cams 59 and 58, rotate clockwise and counterclockwise, respectively, in a direction reverse to that when the lift force moved upwardly to lift the unloader. The tension in the relaxing springs urges said pinions, shafts, and cams into the above rotary motions as the lift force is being relieved. When the spokes of the respective cams bear against the associated shafts, the rotation of the above elements ceases, the relaxation of the springs ceases, and the remaining tension in the springs is maintained therein as an initial, locked-in, tension force.

For convenience of transporting and lifting the unloader 21, there is provided, see FIGS. 1 and 15, a low four wheeled truck vehicle 23 having a jib crane 22 fixedly mounted thereon. When being transported, the unloader is carried and rests on the deck of said truck as shown by the dotted line outline indicated at 82.

The jib crane, see FIG. 15, comprises a swingable arm or jib 83 mounted on a piston post 84 telescopically slidable in cylindrical base 85. The piston post 84 is hydraulically actuated in vertical movement by means of fluid pressure in the working chamber 86 of cylindrical base 85. Said cylindrical base communicates with a source of fluid under pressure (not shown) by means of tube 87 and is controlled by valve means 88.

A trolley means, generally indicated at 89, see FIGS. 2 and 3, moves on said jib 83, and carries the unloader through means of the interconnection of eyes 53 and 91.

When a field chopper wagon 24 is to be unloaded, it is suitably positioned as hereinafter described, and the truck 23 with the jib crane and unloader thereon maneuvered into position adjacent the wagon so that the unloader can be swung against the open front end of the wagon for cooperation therewith.

The unloader is initially lifted from the truck to an approximate predetermined operating elevation, by means of the hydraulically actuated jib crane 22. The jib arm 83 is then manually swung toward the front end of the wagon, and the unloader is then manually moved along the jib arm as desired to an approximate operating position against the front end of said wagon 24.

Interconnecting lock means on the side walls of said unloader and wagon, generally indicated at 92 and 93, respectively, see FIGS. 2, 3 and 13, are brought into precise registry, in elevation, through means of ratchet adjusting means generally indicated at 94, see FIGS. 2 and 7.

In view of the fact that said companion lock means are similar in construction, only one thereof, namely lock means 92 will be described.

Said interconnecting lock means 92 comprises a slidable latch means, generally indicated at 95, on unloader side wall 28, coacting with apertured latch receiving means 96 on wagon 24, see FIGS. 3 and 13.

The slidable latch means comprises an elongated cylindrical receiving member 97 on a mounting base 98, mounted horizontally disposed on side wall 28 of unloader 21. A rodular latch 99 is slidably received in said cylindrical member 97 and extends beyond each end thereof. The inner end 101 of said latch is threaded and threadedly engages an adjusting sleeve member 102. An L-shaped lever arm 103 is pivotally mounted, at the end of its short leg, on a pin 104 fixedly projecting from side wall 28, said pin being aligned with the axis of said rodular latch 99. A bifurcated link 105 pivotally connects said rodular adjusting sleeve 102 and said L-shaped lever 103, by means of pins 106 and 107. Said link 105 is bifurcated at each end. The bifurcated end at the sleeve 102 is adapted to normally straddle said sleeve 102. The bifurcated end at the L-shaped lever 103 is arcuately formed as at 108 and is disposed astraddle the short leg of said L-shaped lever arm and pivotally connected thereto intermediate the ends of said short leg. Said extended arcuate bifurcations allows the pivotal pin 107 to be swung and disposed below the axis of fixed pin 104, thereby providing a "past center" locking arrangement limited in movement by stop pin 109, see FIG. 3.

The apertured latch receiving means 96 comprises a bracket 111 centrally apertured at 112 to receive the outer end 113 slidably therethrough. Said bracket is mounted on the side wall of wagon 24 and disposed to confront the rodular latch 99, with the aperture 112 in axial alignment with the rodular latch 99. Said outer end portion 113 is provided with a vertical bore to receive latch pin 114 somewhat loosely therein.

In operation of the lock means, the unloader 21 is maneuvered relative to the front of the wagon 24 until the rodular latch 99 is in alignment with the receiving aperture 112. When thus positioned the lever 103 is manually raised to the dotted line position 110, see FIG. 3, which actuates the slidable latch 99 forwardly through receiving aperture 112 in the latch receiving means 96. Latch pin 114 is then dropped into the latch pin receiving bore in the end portion 113 of latch 99. Thereupon the lever 103 is manually swung downwardly to a position against stop pin 109. During its downward movement lever 103 actuates the slidable latch 99 backwardly, until latch pin 114 bears against bracket 111. Continued downward movement of the lever draws the bracket 111 against the face of cylinder 97, thereby drawing the wagon and unloader tightly together; and a further slight terminal movement of the lever disposes the lever in a "past center" locking arrangement as described hereinbefore. Adjusting sleeve 102 can be advanced or retracted, on the threaded end 101 of rodular latch 99, to effect an efficient operating relation of the elements comprising the lock means 92.

To effect a precise elevational positioning of the slidable latch 99 relative to its reeciving aperture 112, a ratchet adjusting means, generally indicated at 94, see FIGS. 2 and 7, is provided. Said elevational adjusting means comprises a ratchet wheel 115, see FIGS. 2 and 6, mounted rotatively-rigid on the end of shaft 54, as by means of key 116.

Astraddle said ratchet wheel 115 is pivotally mounted on said shaft 54 a bifurcated long tubular arm 117. Said arm is normally disposed projecting downwardly for operation by an operator on the ground. The bifurcations are provided with oppositely disposed longitudinal slots 118 and 119, the upper end portions of the slots extending approximately to the base of the teeth on the ratchet wheel 115. Within said tubular arm are provided a plurality of spaced bulkheads, such as indicated at 121, 122, 123, and 124 provided with central apertures axially aligned.

Slidably engaged in said apertures is a long control rod 125, see FIG. 8, threadedly engaged at its upper end into a transversely disposed pawl 126 which is slidably mounted in slot guides 118 and 119. A compression spring 127, surrounding said control rod 125, is disposed to abut against bulkhead 124 and shoulder against pawl 126 whereby to urge and bias the pawl and associated control rod to the upper ends of guide slots 118 and 119 and into the space between adjacent ratchet teeth such as indicated at 128, see FIG. 6.

The lower end of tubular arm 117 is provided with a projecting hand grip handle 129 fixed into the tubular arm as by threaded engagement or the like.

The lower end portion of tubular arm 117 is also longitudinally slotted as at 131 to allow the reciprocation therein of a stud pin 132 fixed into control rod 125 as by threaded engagement or the like.

When the unloader is elevated by the hydraulically actuated crane and swung into approximate position adjacent the front end of an unloader wagon, the sidewise positionment of the unloader relative to the wagon is usually quite easily accomplished by manually moving the unloader along the jib until the desired sidewise alignment is attained. However, the precise elevational positionment of the slidable latch 99 relative to its receiving aperture on the wagon is accomplished through means of the said elevational adjusting ratchet means described above.

In the operation thereof, an operator standing on the ground, along one side of the unloader, and in full view of the lock means 92, reaches over with one hand and grasps the handle 129 therewith. He then swings the handle and associated engaged ratchet means clockwise or counterclockwise to effect a raising or lowering of the unloader, as required to align the slidable latch with its receiving aperture. The unloader being counterbalanced, only a very slight force is required to raise it. The lock means 92 is then operated to effect a securement of the unloader to the wagon as described above for the operation of said lock means.

In the event a new engaged ratchet position is required, for a more convenient and efficient manipulation of the ratchet adjusting means, the operator's hand and fingers are extended to grasp both the handle 129 and the stud pin 132. Upon a squeezing or closing of the operator's hand, stud pin 132 is drawn downwardly toward fixed handle 129. As a result thereof, control rod 125 is also correspondingly moved and the associated pawl 126 is thereby withdrawn from its engaged position between adjacent teeth of ratchet wheel 115, against the action of compression spring 127, to a disengaged position outside the periphery of said ratchet wheel 115. The operator then freely swings the control arm means 117 to a new position relative to the stationary ratchet wheel, then relaxes his squeezing hold on the handle 129 and stud pin 132, and allows the action of compression spring 127 to urge pawl 126 into engagement at the new selected position between other adjacent teeth of ratchet wheel 115.

The tubular arm means 117 should preferably be of a length so that handle 129 can be conveniently reached and manipulated by an operator standing on the ground and in an operating position in full view of the lock means 92.

When the operator securely locks one side of the unloader and wagon, as by lock means 92, he then proceeds to the other side of the unloader and proceeds to register and secure lock means 93 by the same procedure as outlined above for lock means 92.

In the matter of effecting the above precise elevational positionment of the slidable lock latch 99 relative to its receiving aperture 112, the compensation cams 58 and 59 function as follows.

Assume that the unloader is in a balanced status, pending from its trolley and jib support means, adjacent the front end of the chopper wagon, and that the unloader needs to be raised or elevated upwardly to accomplish precise registry of the lock means 92.

To accomplish such elevated or raised positionment, the control arm 117, of the ratchet adjusting means 94, is swung clockwise. This causes the pinions 56 and 57 to rotate oppositely and travel up the rack means. As the pinions are thus rotated, their associated rotatively-rigid compensation cams 59 and 58, respectively, are caused to rotate correspondingly, that is cam 59 rotates clockwise and cam 58 rotates counterclockwise. In rotating so, the cams carry their respective cables 77 and 72 along with them, thereby angularly displacing the ends of the cables and in effect "paying-out" or "unwinding" the cables.

As the cables are progressively payed out, the associated springs are progressively correspondingly relaxed, retracted, and force relieved, thereby tending to unbalance or "underbalance" the initial balanced status of the system.

However, the compensation cams prevent such unbalancing, by correspondingly compensating for said unbalancing effects resulting from such tension diminution in the springs. As the "high" end of the cams, namely those ends indicated by reference numerals 65 and 63, most distant from the axis of rotation of said cams, are rotated or moved toward their respective springs, the effective lever or moment arm (perpendicular distance from the cable to the cam axis) is progressively increased, thereby compensating for the force diminution of the spring resulting from its retraction. Consequently a balanced status of the system is thereby always automatically maintained.

To accomplish a lowered positionment of the unloader, the ratchet engaged arm 117 is swung counterclockwise. This causes the pinions to rotate and travel down the rack means, and a downward movement therewith of the unloader. As the pinions are thus rotated, their associated rotatively-rigid compensation cams 59 and 58 are caused to rotate correspondingly, that is cam 59 rotates counterclockwise and cam 58 rotates clockwise. In rotating so, the cams carry their associated cables 72 and 71 along with them, thereby angularly displacing the ends of the cables and in effect "drawing-in" or "winding-up" the cables.

As the cables are progressively drawn in, the associated springs are progressively correspondingly strained, stretched, extended, and force increased, thereby tending to unbalance or "overbalance" the initial balanced status of the system.

However, the compension cams prevent such overbalancing, by correspondingly and incrementally compensating for said unbalancing effects resulting from such tension accretion or increasement in the springs. As the "low" end of the cams, namely those ends indicated by reference numerals 66 and 64, and most closely disposed toward the axis of rotation of said cams, are rotated or moved away from their respective springs, the effective lever or moment arm (perpendicular distance from the cam axis to the cable) is progressively decreased, thereby compensating for the force accretion or increasement of the spring resulting from its stretching or extension. Consequently, again, the balanced status of the system is thereby automatically maintained.

The inner mechanism of the unloader, see FIG. 2, comprises a plurality of three horizontally disposed and vertically spaced rotary feeder or rake means, generally indicated at 133, 134 and 135, are journalled in and across the side walls 27 and 28 of support frame 26, in apertures, such as indicated at 136 and 137, see FIG. 9. The above rotary rake means all lie in substantially the same plane.

The rake means 133 comprises a rake frame, such as indicated generally at 136 in FIG. 10, having a shaft 137, see FIG. 2, journalled in and across the side walls 27 and 28 of the support frame 26, equilateral triangular frame plates 138, 139 and 141, centrally apertured to receive shaft 137 therein, and welded in spaced relation thereon, and tube beams 142, 143 and 144, welded in recesses formed at the apexes of said triangular frame plates.

Spaced tines, such as indicated at 145, are disposed radially of said shaft 137 and fixedly mounted on said tube beams by any means, such as by welding or threaded engagement, and project outwardly therefrom. The function of said tines is to engage the feed material in the open ended chopper wagon and discharge the same downwardly and rearwardly therefrom. If desired, said tines may be tilted forwardly, in the direction of rotation, to more suitably engage the feed material, such as indicated at 140, see FIG. 11.

Rotary rake means 134 and 135 are similarly constructed, except that their shafts extend a greater distance beyond the side walls of said box-like frame, to accommodate sheaves and pulleys thereon, as hereinafter described.

A windless or winding shaft 146 is journalled in and across the side walls 27 and 28 in apertures 147 and 148 provided in said side walls, see FIGS. 2, 3 and 9. Said winding shaft is located in elevation so that the top portion of its periphery is disposed slightly above the wagon floor or platform 149 when the unloader and wagon are operatively associated, see FIG. 3.

The field chopper wagon 24, see FIG. 4, is of the conventional type in which crops such as chopped hay, ensilage, or other cut-up fodder, vegetation, or the like, may be discharged, and is particularly devised to operate usually, though not necessarily, to have its contents moved progressively to the front end of said wagon for discharge therefrom. Said wagon is provided with a forwardly opening body, and having a floor 149, sides 151 and 152 between which operates a follower, generally indicated at 153, usually slidable on the floor 149 and propelled rearwardly by two spaced chains 154 and 155, or the like, which interconnect the follower 153 and the winding shaft 146. The follower is drawn to the front end of the wagon, forcing the chopped hay or the like in the wagon ahead of it as the chains are wound around the rotatable winding shaft 146.

The follower 153 comprises a pair of spaced runners 156 and 157 having mounted thereacross a vertically disposed plate or wall member 158, suitably braced as at 159 and 161.

Said wagon is provided with suitable wheels such as indicated at 162, see FIGS. 2 and 3.

The shaft 163 of the rotatable rake means 135, see FIGS. 2 and 3, is provided with a rotatively-rigid drive pulley 164, belt connected at 165 to the power take-off pulley 166 of tractor 167, see FIG. 1.

Sheave 167, mounted rotatively-rigid on rotatable rake shaft 163, drives sheave 168 mounted rotatively-rigid on rotatable rake shaft 169, through means of belt 171, see FIGS. 2 and 3.

Sheave 172, mounted rotatively-rigid on rotatable rake shaft 169, drives sheave 173 mounted rotatively-rigid on rotatable rake shaft 137, through means of belt 174.

Bevel gear 175, mounted rotatively-rigid on rotatable rake shaft 163, enmeshes with and drives bevel gear 176 mounted rotatively-rigid on vertically disposed shaft 177 journalled in spaced brackets 178 and 179, see FIGS. 2 and 3.

A worm 181, formed on vertical shaft 177, enmeshes with a worm wheel 182 formed on the end of winding shaft 146. Said worm gear means drives the winding shaft 146, see FIGS. 2 and 3.

A horizontally disposed endless conveyor, generally indicated at 183, see FIG. 3, is provided at the bottom of the unloader, for receiving the chopped hay or the like and discharging it into a blower 20, see FIG. 1.

The conveyor comprises a series of trunnioned rollers 183, 184, 185 and 186 journalled in and across lower bar members 32 and 33, in apertures such as indicated at 187, see FIG. 9.

An endless belt 188, provided with cleats 189, is trained over said trunnioned rollers.

A bevel gear 191, see FIG. 3, mounted rotatively-rigid on the lower end of vertical shaft 177, enmeshes with and drives bevel gear 192 mounted rotatively-rigid on trunnioned roller 186, thereby driving the endless belt 188 which is operatively trained over said trunnioned roller 186 and the other rollers 185, 184 and 183.

The blower 20 is operatively disposed to receive the chopped hay from the endless belt conveyor 183 through means of short communicating chute 193, see FIG. 1.

A pulley means 194, see FIGS. 1 and 2, mounted rotatively-rigid on the rotatable rake shaft 163 is belt connected as at 195 to blower pulley 196 for driving said blower. Obviously, independent power means may be used if desired to drive said blower.

Obviously conventional equivalents such as sprocket and chain means, or the like, may be substituted for belt and pulley or sheave means wherever suitable.

In operation, when the field chopper wagon 24 is brought from the field loaded with chopped hay or the like, it is drawn to a position suitably close to a storage zone such as a barn loft, silo, bin, or the like. The truck 23, carrying the unloader 21 thereon, is maneuvered to a position adjacent the front end of said wagon. The crane 22 then is used to lift the unloader 21 from the truck to an approximate operative elevation relative to the wagon.

To position the unloader in close proximity to the front end of the wagon, the crane jib is manually swung toward the front end of the wagon, and the unloader manually moved along the jib, on its trolley, as needed.

To effect a more precise elevational positionment of the unloader, for the registration of the lock means 92, the ratchet adjusting means 94 is manipulated as required.

When the lock means are in registry, it is operatively actuated into a "past center" locking status thereby drawing the wagon and unloader tightly together. This lock means functions not only to operatively position the unloader relative to the wagon, but also secures the unloader to the wagon so as to resist the drive belt 165 tension from pulling the unloader from the wagon. Furthermore the lock means is designed to carry the whole load of the unloader, should the lift force of the jib means be entirely relaxed, or to carry any fractional part of the unloader load, should the jib lift means be desired to maintain and carry the remaining fractional part of the unloader load.

The tractor is then operatively connected to the unloader for driving the rotary rakes, the follower 153, conveyor 183, and the blower. As the rotary rakes are revolved, they engage crop material in the wagon, and discharge it downwardly and rearwardly therefrom, and onto the conveyor 183 and the inclined side aprons 40 and 41. Said side aprons prevent the crop from falling to the ground, and otherwise direct said crop material onto said conveyor.

The contents of the wagon are moved progressively forward against the rotary rakes as the chains 154 and 155 are wound around winding shaft 146.

Conveyor 183 discharges the feed material onto chute 193 and thence into blower 20 for delivery to a storage zone.

Some characteristic features of this invention are the provision of a chopper wagon unloader that is pendently supported; a chopper wagon unloader that is pendently supported from a swingable jib; a chopper wagon unloader that is pendently supported on a swingable jib and movable therealong; the combination of a chopper wagon and an unloader, and lock means for securing and supporting said unloader operatively disposed on said wagon; a chopper wagon unloader pending from a support means and counter-balanced thereon; and a chopper wagon unloader pending from a support means and provided with elevational adjusting means, operative from the ground, for manually accomplishing fine elevational increments of the unloader.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A portable unloader means or removing crops from a vehicle having a supporting platform and an open discharge end, said unloader comprising: frame means positionable adjacent said discharge end; movable means on said frame means adapted to engage and cause crops on said vehicle to be removed therefrom, said frame means and movable means comprising unloader means; support means; and suspender means for pendulously supporting said unloader means from said support means; said suspender means including a rack means, rotatable pinion means journalled in said unloader means and engaged with said rack means, means for rotatably actuating said pinion means to move said pinion means relative to said rack means, compensation cam means mounted rotatively-rigid with said pinion means, said cam means being formed so that the points on the operating range of said cam means become progressively nearer to the pivotal axis of said cam means, said points being considered from the initial or leading end to the final or trailing end operating points, and spring means trained over and connected to one end of said cam means, the other end of said spring means being connected to said unloader means, said spring means being operative to balance said unloader means on said suspender means, and said cam means being operative to compensate tension changes in said spring means resulting from changes in position of said pinion means relative to said rack means.

2. A portable unloader means for removing crops from a vehicle having a supporting platform and an open discharge end, said unloader comprising: frame means positionable adjacent said discharge end; movable rake means on said frame means adapted to engage and cause crops on said vehicle to be removed therefrom, said movable rake means being operatively movable downwardly and disposed in a substantially vertical plane, said frame means and movable rake means comprising unloader means; support means; hanger means for pendulously supporting said unloader means from said support means, and adjustable connection means included in said hanger means for regulating the elevation position of the unloader means on said hanger means, said adjustable connection means including rack and pinion means.

3. A portable unloader means for removing crops from a vehicle having a supporting platform and an open discharge end, said unloader comprising: frame means positionable adjacent said discharge end; movable rake means on said frame means adapted to engage and cause crops on said vehicle to be removed therefrom, said movable rake means being operatively movable downwardly and disposed in a substantially vertical plane, said frame means and movable rake means comprising unloader means; support means; hanger means for pendulously supporting said unloader means from said support means, and spring balance means included in said hanger means operative to balance said unloader means on said hanger means.

4. A portable unloader means for removing crops from a vehicle having a supporting platform and an open discharge end, said unloader comprising: frame means positionable adjacent said discharge end; movable rake means on said frame means adapted to engage and cause crops on said vehicle to be removed therefrom, said movable rake means being operatively movable downwardly and disposed in a substantially vertical plane, said frame means and movable rake means comprising unloader means; support means; hanger means for pendulously supporting said unloader means from said support means, and spring balance means included in said hanger means operative to balance said unloader means on said hanger means; adjustable connection means included in said hanger means for regulating the elevation position of said unloader on said hanger means; and compensation means for compensating for the unbalancing effects resulting from changes in elevation position of said unloader means relative to said hanger means.

References Cited in the file of this patent

UNITED STATES PATENTS

| | | |
|---|---|---|
| 941,571 | Fullbright | Nov. 30, 1909 |
| 1,027,669 | Richards | May 28, 1912 |
| 2,329,377 | Imes | Sept. 14, 1943 |
| 2,765,088 | Bull | Oct. 2, 1956 |
| 2,788,904 | Erickson | Apr. 16, 1957 |

FOREIGN PATENTS

| | | |
|---|---|---|
| 1,019,620 | France | Jan. 23, 1953 |